United States Patent
Bradfield

(10) Patent No.: US 8,508,085 B2
(45) Date of Patent: Aug. 13, 2013

(54) INTERNAL COOLING OF STATOR ASSEMBLY IN AN ELECTRIC MACHINE

(75) Inventor: Michael D. Bradfield, Anderson, IN (US)

(73) Assignee: Remy Technologies, LLC, Pendleton, IN (US)

( * ) Notice: Subject to any disclaimer, the term of this patent is extended or adjusted under 35 U.S.C. 154(b) by 285 days.

(21) Appl. No.: 12/897,667

(22) Filed: Oct. 4, 2010

(65) Prior Publication Data

US 2012/0080982 A1 Apr. 5, 2012

(51) Int. Cl.
*H02K 9/00* (2006.01)

(52) U.S. Cl.
USPC .............................. 310/52; 310/64

(58) Field of Classification Search
USPC .................... 310/52, 54, 58, 59, 60 A, 64
See application file for complete search history.

(56) References Cited

U.S. PATENT DOCUMENTS

| | | |
|---|---|---|
| 2,080,678 A | 5/1937 | Van Horn et al. |
| 2,264,616 A | 12/1941 | Buckbee |
| 3,447,002 A | 5/1969 | Ronnevig |
| 3,525,001 A | 8/1970 | Erickson |
| 3,748,507 A | 7/1973 | Sieber |
| 4,038,570 A | 7/1977 | Durley, III |
| 5,081,382 A | 1/1992 | Collings et al. |
| 5,180,004 A | 1/1993 | Nguyen |
| 5,207,121 A | 5/1993 | Bien |
| 5,293,089 A | 3/1994 | Frister |
| 5,372,213 A | 12/1994 | Hasebe et al. |
| 5,519,269 A | 5/1996 | Lindberg |
| 5,616,973 A | 4/1997 | Khazanov |
| 5,859,482 A | 1/1999 | Crowell et al. |
| 5,923,108 A | 7/1999 | Matake et al. |
| 5,937,817 A | 8/1999 | Schanz et al. |
| 5,965,965 A | 10/1999 | Umeda et al. |
| 6,011,332 A | 1/2000 | Umeda et al. |
| 6,069,424 A | 5/2000 | Colello et al. |
| 6,075,304 A | 6/2000 | Nakatsuka |
| 6,087,746 A | 7/2000 | Couvert |
| 6,095,754 A | 8/2000 | Ono |
| 6,097,130 A | 8/2000 | Umeda et al. |
| 6,114,784 A | 9/2000 | Nakano |
| 6,147,430 A | 11/2000 | Kusase et al. |

(Continued)

FOREIGN PATENT DOCUMENTS

| | | |
|---|---|---|
| JP | 05-103445 A | 4/1993 |
| JP | 05-292704 A | 11/1993 |

(Continued)

OTHER PUBLICATIONS

International Search Report completed Apr. 19, 2012.

(Continued)

*Primary Examiner* — Nguyen N Hanh
(74) *Attorney, Agent, or Firm* — Greenberg Traurig LLP

(57) ABSTRACT

Embodiments of the invention provide an electric machine module including an electric machine with a stator assembly. The stator assembly includes a plurality of stator laminations coupled together and a plurality of conductors positioned through axial slots of the plurality of stator laminations. The electric machine module also includes a coolant channel at least partially defined within the axial slots and a housing. The housing at least partially circumscribes the electric machine and at least partially defines a machine cavity which is in fluid communication with the coolant channel.

8 Claims, 5 Drawing Sheets

(56) References Cited

U.S. PATENT DOCUMENTS

| | | | |
|---|---|---|---|
| 6,147,432 A | 11/2000 | Kusase et al. | |
| 6,173,758 B1 | 1/2001 | Ward et al. | |
| 6,181,043 B1 | 1/2001 | Kusase et al. | |
| 6,201,321 B1 | 3/2001 | Mosciatti | |
| 6,208,060 B1 | 3/2001 | Kusase et al. | |
| 6,232,687 B1 | 5/2001 | Hollenbeck et al. | |
| 6,242,836 B1 | 6/2001 | Ishida et al. | |
| 6,291,918 B1 | 9/2001 | Umeda et al. | |
| 6,300,693 B1 | 10/2001 | Poag et al. | |
| 6,313,559 B1 | 11/2001 | Kusase et al. | |
| 6,333,537 B1 | 12/2001 | Nakamura | |
| 6,333,573 B1 | 12/2001 | Nakamura | |
| 6,335,583 B1 | 1/2002 | Kusase et al. | |
| 6,346,758 B1 | 2/2002 | Nakamura | |
| 6,359,232 B1 | 3/2002 | Markovitz et al. | |
| 6,404,628 B1 | 6/2002 | Nagashima et al. | |
| 6,417,592 B2 | 7/2002 | Nakamura et al. | |
| 6,459,177 B1 | 10/2002 | Nakamura et al. | |
| 6,509,665 B1 | 1/2003 | Nishiyama et al. | |
| 6,515,392 B2 | 2/2003 | Ooiwa | |
| 6,522,043 B2 | 2/2003 | Masegi | |
| 6,559,572 B2 | 5/2003 | Nakamura | |
| 6,570,277 B2 * | 5/2003 | Tsuneyoshi et al. | 310/54 |
| 6,579,202 B2 | 6/2003 | El-Antably et al. | |
| 6,770,999 B2 | 8/2004 | Sakurai | |
| 6,856,053 B2 * | 2/2005 | LeFlem et al. | 310/54 |
| 6,897,594 B2 | 5/2005 | Ichikawa et al. | |
| 6,903,471 B2 | 6/2005 | Arimitsu et al. | |
| 6,998,749 B2 | 2/2006 | Wada et al. | |
| 7,002,267 B2 | 2/2006 | Raszkowski et al. | |
| 7,026,733 B2 | 4/2006 | Bitsche et al. | |
| 7,239,055 B2 | 7/2007 | Burgman et al. | |
| 7,242,119 B2 * | 7/2007 | Gomes De Lima | 310/52 |
| 7,276,006 B2 | 10/2007 | Reed et al. | |
| 7,284,313 B2 | 10/2007 | Raszkowski et al. | |
| 7,339,300 B2 | 3/2008 | Burgman et al. | |
| 7,352,091 B2 | 4/2008 | Bradfield | |
| 7,402,923 B2 | 7/2008 | Klemen et al. | |
| 7,417,344 B2 | 8/2008 | Bradfield | |
| 7,508,100 B2 | 3/2009 | Foster | |
| 7,538,457 B2 | 5/2009 | Holmes et al. | |
| 7,545,060 B2 | 6/2009 | Ward | |
| 7,592,045 B2 | 9/2009 | Smith et al. | |
| 7,615,903 B2 | 11/2009 | Holmes et al. | |
| 7,615,951 B2 | 11/2009 | Son et al. | |
| 7,667,359 B2 | 2/2010 | Lee et al. | |
| 7,939,975 B2 | 5/2011 | Saga et al. | |
| 8,067,865 B2 | 11/2011 | Savant | |
| 8,068,327 B2 | 11/2011 | Seifert et al. | |
| 2003/0075996 A1 * | 4/2003 | Yoshida et al. | 310/58 |
| 2003/0222519 A1 | 12/2003 | Bostwick | |
| 2004/0036367 A1 | 2/2004 | Denton et al. | |
| 2004/0189110 A1 | 9/2004 | Ide | |
| 2004/0195929 A1 | 10/2004 | Oshidari | |
| 2005/0023266 A1 | 2/2005 | Ueno et al. | |
| 2005/0023909 A1 | 2/2005 | Cromas | |
| 2005/0194551 A1 | 9/2005 | Klaussner et al. | |
| 2005/0200212 A1 * | 9/2005 | Lima | 310/59 |
| 2005/0274450 A1 | 12/2005 | Smith et al. | |
| 2005/0285456 A1 | 12/2005 | Amagi et al. | |
| 2006/0043801 A1 * | 3/2006 | Adra | 310/54 |
| 2007/0024130 A1 | 2/2007 | Schmidt | |
| 2007/0052313 A1 | 3/2007 | Takahashi | |
| 2007/0063607 A1 | 3/2007 | Hattori | |
| 2007/0145836 A1 | 6/2007 | Bostwick | |
| 2007/0149073 A1 | 6/2007 | Klaussner et al. | |
| 2007/0216236 A1 | 9/2007 | Ward | |
| 2008/0223557 A1 | 9/2008 | Fulton et al. | |
| 2009/0121562 A1 | 5/2009 | Yim | |
| 2009/0174278 A1 | 7/2009 | Sheaffer et al. | |
| 2009/0206687 A1 | 8/2009 | Woody et al. | |
| 2010/0026111 A1 | 2/2010 | Monzel | |
| 2010/0102649 A1 | 4/2010 | Cherney et al. | |
| 2010/0109454 A1 | 5/2010 | Vadillo et al. | |
| 2010/0176668 A1 | 7/2010 | Murakami | |
| 2011/0050141 A1 | 3/2011 | Yeh et al. | |
| 2011/0101700 A1 | 5/2011 | Stiesdal | |
| 2011/0109095 A1 | 5/2011 | Stiesdal | |

FOREIGN PATENT DOCUMENTS

| | | |
|---|---|---|
| JP | 06-036364 U | 5/1994 |
| JP | 06-311691 A | 11/1994 |
| JP | 07-264810 A | 10/1995 |
| JP | 08-019218 A | 1/1996 |
| JP | 09-046973 A | 2/1997 |
| JP | 09-154257 A | 6/1997 |
| JP | 10-234157 A | 9/1998 |
| JP | 11-132867 A | 5/1999 |
| JP | 11-206063 A | 7/1999 |
| JP | 2000-152563 A | 5/2000 |
| JP | 2000-324757 A | 11/2000 |
| JP | 2000-333409 A | 11/2000 |
| JP | 2001-333559 A | 11/2001 |
| JP | 2002-095217 A | 3/2002 |
| JP | 2002-119019 A | 4/2002 |
| JP | 2003-250247 A | 9/2003 |
| JP | 2003-299317 A | 10/2003 |
| JP | 2003-324901 A | 11/2003 |
| JP | 2004-215353 A | 7/2004 |
| JP | 2004-236376 A | 8/2004 |
| JP | 2004-248402 A | 9/2004 |
| JP | 2004-297924 A | 10/2004 |
| JP | 2004-312886 A | 11/2004 |
| JP | 2004-357472 A | 12/2004 |
| JP | 2005-012989 A | 1/2005 |
| JP | 2005-057957 A | 3/2005 |
| JP | 2005-168265 A | 6/2005 |
| JP | 2006-060914 A | 3/2006 |
| JP | 2000-152561 A | 9/2006 |
| JP | 2006-297541 A | 11/2006 |
| JP | 2006-528879 A | 12/2006 |
| JP | 2007-282341 A | 10/2007 |
| JP | 2008-021950 A | 2/2008 |
| JP | 2008-206213 A | 9/2008 |
| JP | 2008-219960 A | 9/2008 |
| JP | 4187606 B2 | 11/2008 |
| JP | 2008-544733 A | 12/2008 |
| JP | 2009-247084 A | 10/2009 |
| JP | 2009-247085 A | 10/2009 |
| JP | 2009-254205 A | 10/2009 |
| JP | 2010-028908 A | 2/2010 |
| JP | 2010-028958 A | 2/2010 |
| JP | 2010-035265 A | 2/2010 |
| JP | 2010-063253 A | 3/2010 |
| JP | 2010-121701 A | 6/2010 |
| KR | 10-1997-0055103 A | 7/1997 |
| KR | 10-2000-0013908 A | 3/2000 |
| KR | 10-2006-0102496 A | 9/2006 |
| KR | 10-2007-0027809 A | 3/2007 |
| KR | 10-2009-0048028 A | 5/2009 |

OTHER PUBLICATIONS

International Search Report.
International Search Report completed Apr. 9, 2012.
International Search Report completed Apr. 20, 2012.
International Search Report completed Mar. 8, 2012.
International Search Report completed Apr. 24, 2012.
WIPO Search Report and Written Opinion dated Oct. 29, 2012 for corresponding Application No. PCT/US2012/033915; 8 sheets.
WIPO Search Report and Written Opinion dated Nov. 14, 2012 for corresponding Application No. PCT/US2012/040794; 8 sheets.

* cited by examiner

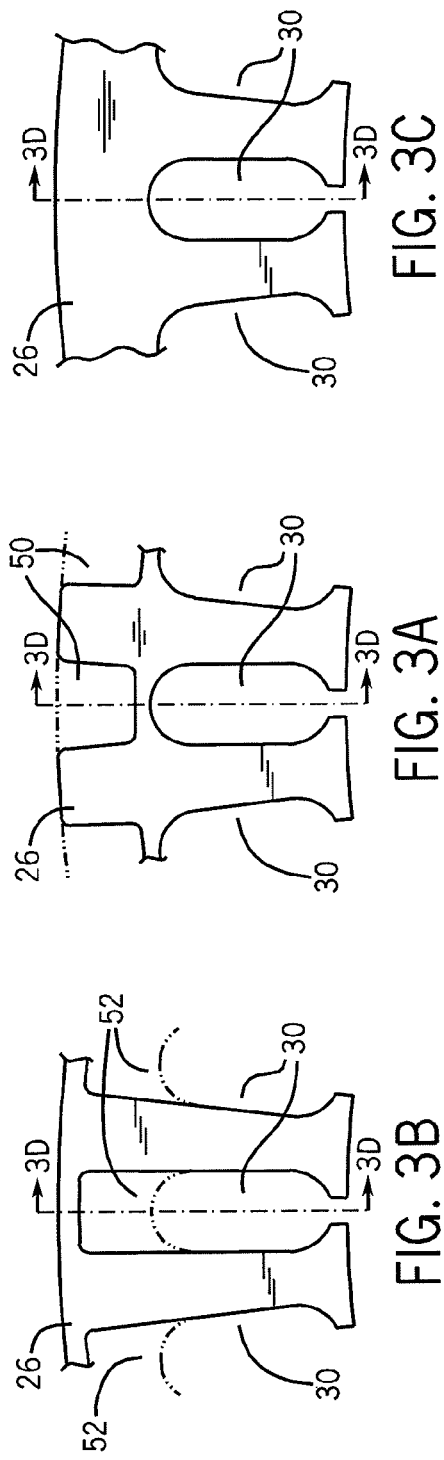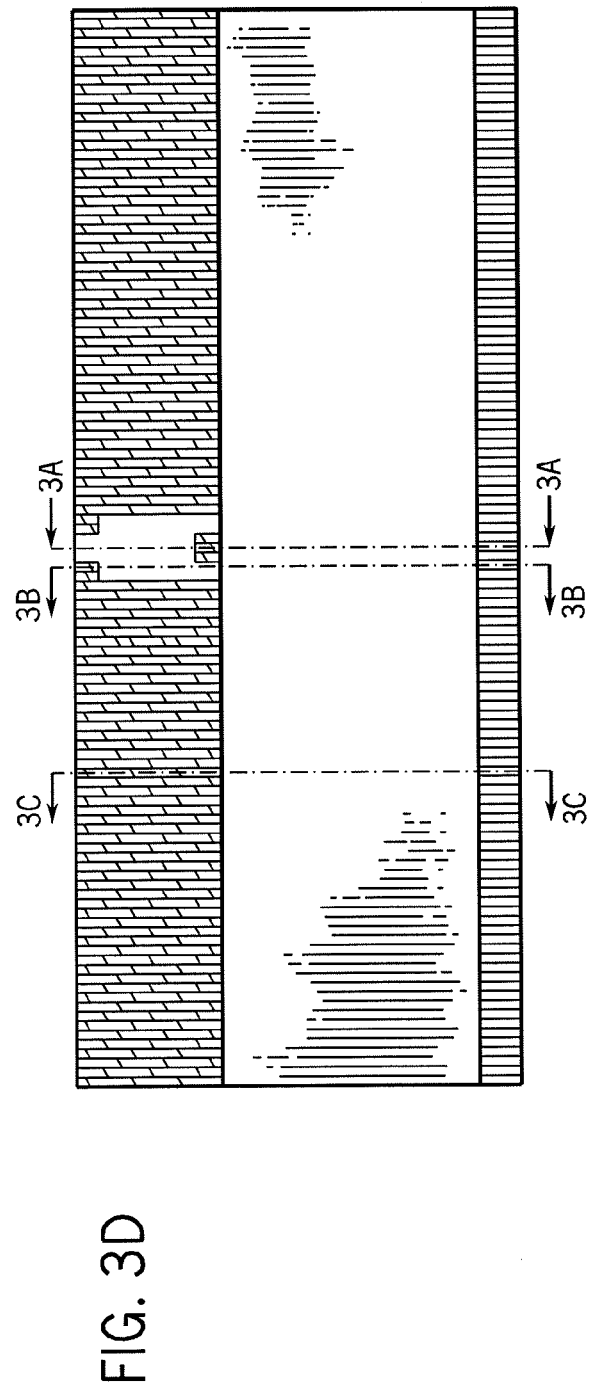

INTERNAL COOLING OF STATOR ASSEMBLY IN AN ELECTRIC MACHINE

BACKGROUND

Electric machines, often contained within a housing, are generally comprised of a stator assembly and a rotor. During operation of electric machines, a considerable amount of heat energy can by generated by both the stator assembly and the rotor, as well as other components of the electric machine. Conventional cooling methods include removing the generated heat energy by forced convection to a jacket filled with a coolant. The coolant jacket is often contained within or outside walls of the housing.

SUMMARY

Some embodiments provide an electric machine module including an electric machine with a stator assembly. The stator assembly includes a plurality of stator laminations coupled together and a plurality of conductors positioned through axial slots of the plurality of stator laminations. The electric machine module also includes a coolant channel at least partially defined within the axial slots and a housing. The housing at least partially circumscribes the electric machine and at least partially defines a machine cavity, which is in fluid communication with the coolant channel.

Some embodiments provide an electric machine module including an electric machine with a stator assembly. The stator assembly includes a plurality of stator laminations coupled together and a plurality of conductors positioned through axial slots of the plurality of stator laminations. The plurality of stator laminations includes at least a first set of stator laminations and a second set of stator laminations positioned adjacent to the first set of stator laminations. The electric machine module also includes a coolant channel at least partially defined within the axial slots of the plurality of stator laminations. The second set of stator laminations each include an additional notch extending radially outward from the axial slots and in fluid communication with the coolant channel. The first set of stator laminations each include an outer notch separate and radially outward from the axial slots and in fluid communication with the additional notches. The electric machine module further includes a coolant jacket at least partially circumscribing the electric machine and in fluid communication with the outer notch of the first set of stator laminations.

Some embodiments provide a method for cooling an electric machine module. The method may include providing an electric machine including a stator assembly. The stator assembly includes a plurality of stator laminations with axial slots and a coolant channel defined across the axial slots. The method also includes providing a housing at least partially circumscribing the electric machine. The housing includes a coolant jacket and a sleeve member at least partially separating the coolant jacket from the electric machine. The sleeve member includes a coolant passageway in fluid communication with the coolant jacket and the plurality of stator laminations. The method further includes positioning the plurality of stator laminations so that the coolant passageway is in fluid communication with the coolant channel, introducing a coolant into the coolant jacket, and circulating the coolant from the coolant jacket, through the coolant channel, and through the coolant passageway to cool the electric machine.

DESCRIPTION OF THE DRAWINGS

FIG. 3A is a partial side cross-sectional view of a stator lamination comprising a first lamination design, according to one embodiment of the invention.

FIG. 3B is a partial side cross-sectional view of a stator lamination comprising a second lamination design, according to one embodiment of the invention.

FIG. 3C is a partial side cross-sectional view of a stator lamination comprising a third lamination design, according to one embodiment of the invention.

FIG. 3D is a partial front cross-sectional view of a plurality of stator laminations stacked together according to one embodiment of the invention.

DETAILED DESCRIPTION

Figure 1:
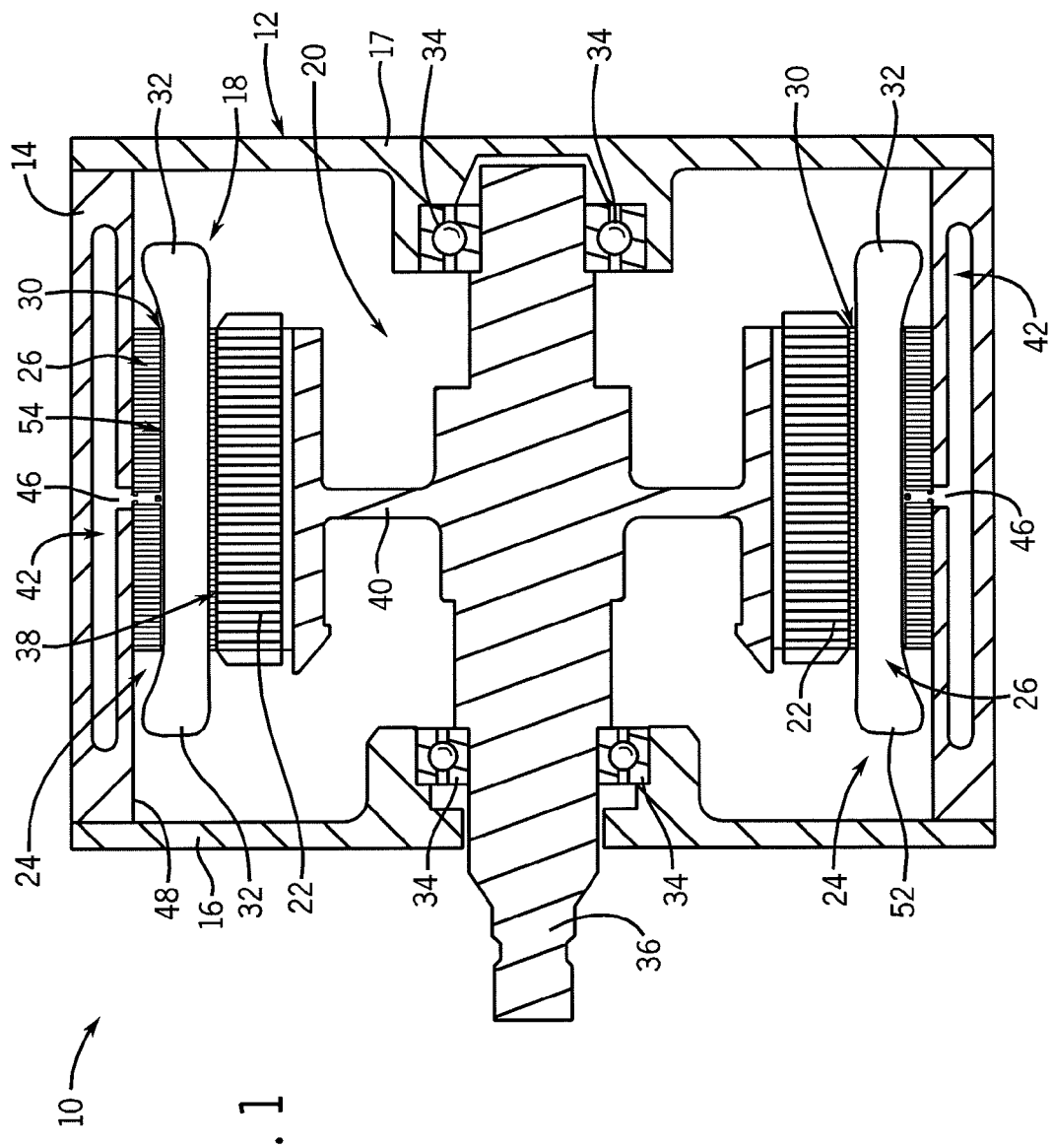
FIG. 1 is a perspective view of an electric machine module according to one embodiment of the invention.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

The following discussion is presented to enable a person skilled in the art to make and use embodiments of the invention. Various modifications to the illustrated embodiments will be readily apparent to those skilled in the art, and the generic principles herein can be applied to other embodiments and applications without departing from embodiments of the invention. Thus, embodiments of the invention are not intended to be limited to embodiments shown, but are to be accorded the widest scope consistent with the principles and features disclosed herein. The following detailed description is to be read with reference to the figures, in which like elements in different figures have like reference numerals. The figures, which are not necessarily to scale, depict selected embodiments and are not intended to limit the scope of embodiments of the invention. Skilled artisans will recognize the examples provided herein have many useful alternatives and fall within the scope of embodiments of the invention.

FIG. 1 illustrates an electric machine module 10 according to one embodiment of the invention. The electric machine module 10 can include a housing 12 comprising a sleeve member 14, a first end cap 16, and a second end cap 17. An electric machine 18 can be housed within a machine cavity 20 at least partially defined by the sleeve member 14 and the end caps 16, 17. The housing 12 can at least partially circumscribe the electric machine 18. For example, the sleeve member 14 and the end caps 16, 17 can be coupled via fasteners (not shown), or another suitable coupling manner, to enclose the electric machine 18 within the machine cavity 20. In other embodiments, the housing 12 can comprise a substantially enclosed, substantially cylindrical canister and a single end cap (not shown).

The electric machine 18 can include a rotor 22, a stator assembly 24 comprising a plurality of stator laminations 26, a plurality of conductors 28 through axial slots 30 created by the stator laminations 26, and conductor end turns 32. The electric machine 18 can also include bearings 34, and can be disposed about a main output shaft 36. As shown in FIG. 1, the stator assembly 24 can circumscribe the rotor 22, and a radial air gap 38 can exist between the rotating rotor 22 and the stationary stator assembly 24. In some embodiments, the electric machine 18 can also include a rotor hub 40 or can have a "hub-less" design (not shown). The electric machine 18 can be, without limitation, an electric motor, such as a hybrid electric motor, an electric generator, or a vehicle alternator. In one embodiment, the electric machine 18 can be a High Voltage Hairpin (HVH) electric motor for use in a hybrid vehicle.

Components of the electric machine 18 such as, but not limited to, the conductors 28 can generate heat during operation of the electric machine 18. These components can be cooled to enhance the performance of and increase the lifespan of the electric machine 18.

Figure 2:
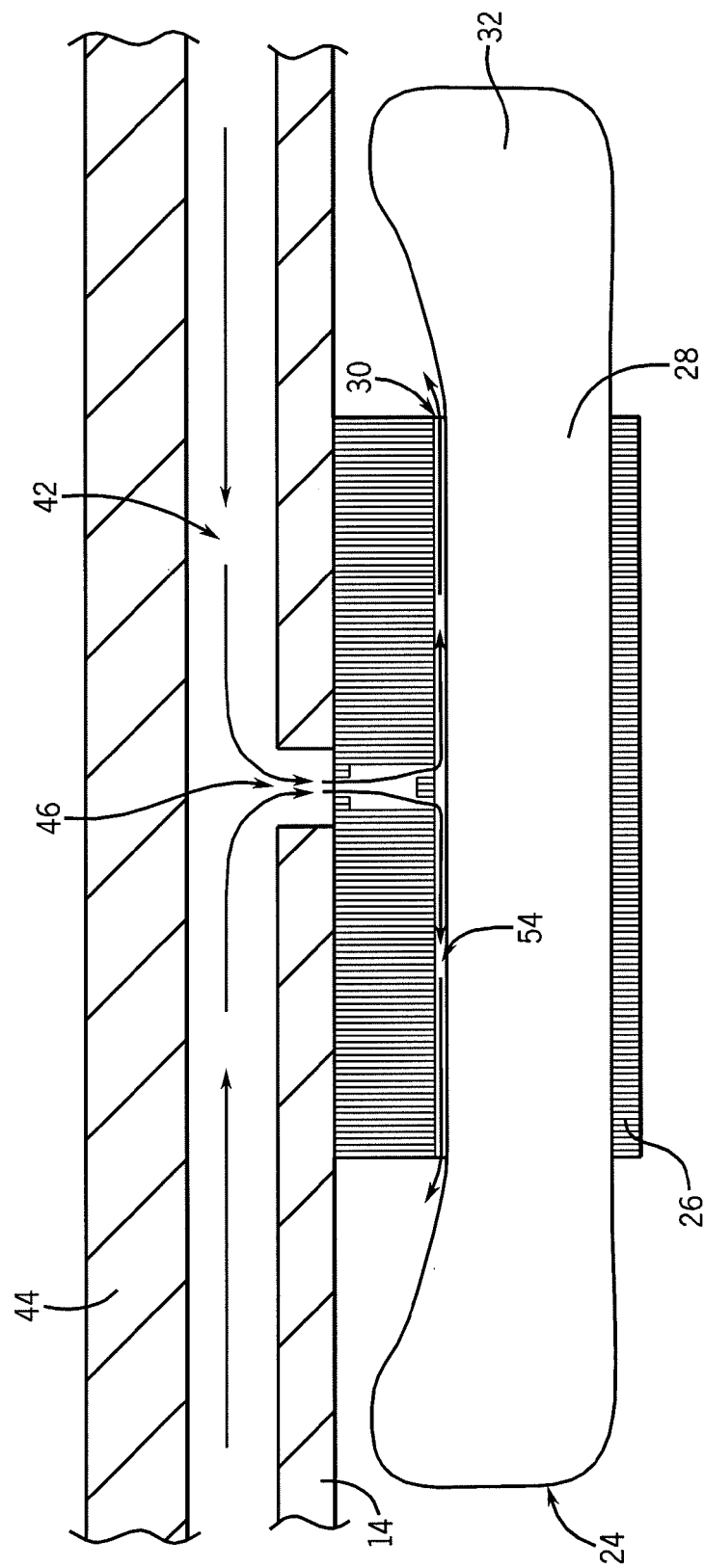
FIG. 2 is a partial front cross-sectional view of an electric machine module according to another embodiment of the invention.

In some embodiments, as shown in FIG. 1, the sleeve member 14 (or the substantially enclosed, substantially cylindrical canister of some embodiments) can include an internal coolant jacket 42. In other embodiments, as shown in FIG. 2, the coolant jacket 42 can be defined by an outer diameter of the sleeve member 14 and an inner diameter of an outside housing 44, such as a transmission housing. The coolant jacket 42 can substantially circumscribe or at least partially surround the stator assembly 24 and can contain a coolant (e.g., ethylene glycol, a water/ethylene glycol mixture, oil, transmission fluid, or a similar substance). The coolant jacket 42 can be in fluid communication with a fluid source (not shown) which can pressurize the coolant prior to or as it is being dispersed into the coolant jacket 42, so that the pressurized coolant can circulate through the coolant jacket 42. Heat energy generated by the electric machine 12 can be transferred to the coolant as it circulates through the coolant jacket 42, thus cooling the electric machine 12. After circulating through the coolant jacket 42, the coolant can be directed to a heat transfer element (e.g., a radiator, a heat exchanger, etc.), which can remove the heat energy from the coolant.

In some embodiments, the sleeve member 14 (or the substantially enclosed, substantially cylindrical canister of some embodiments) can include one or more coolant passageways 46 between the coolant jacket 42 and the machine cavity 20. The coolant passageways 46 can be positioned so that a portion of the coolant flowing through the coolant jacket 42 can flow through the coolant passageways 46 toward the stator assembly 24. For example, in one embodiment, the coolant passageways 46 can be positioned through an inner wall 48 of the sleeve member 14 directly adjacent to the stator assembly 24, as shown in FIG. 1. In some embodiments, the coolant passageways 46 can be positioned radially around at least a portion of the electric machine module 10.

The plurality of stator laminations 26 can be positioned relative to each other to allow the coolant that flows through the coolant passageways 46 to reach the axial slots 30. For example, in one embodiment, the plurality of stator laminations 26 can include three different lamination designs, as shown in FIGS. 3A-3D. All three lamination designs can include the axial slots 30 at substantially the same radial location such that when the stator laminations 26 are stacked, axial coolant channels 54, as described below, can be formed through the stack of stator laminations 26, allowing coolant to flow through the stator assembly 24.

One or more of the stator laminations 26 located substantially directly radially inward from the coolant passageways 44 can comprise a first lamination design. As shown in FIGS. 3A and 3D, the stator laminations 26 with the first lamination design can each include the axial slots 30 as well as an outer notch 50 radially outward from each axial slot 30. The outer notches 50 can be separate from the axial slots 30 and in fluid communication with the coolant passageways 46 in order to receive the coolant.

One or more of the stator laminations 26 directly adjacent to the stator laminations 26 with the first lamination design can comprise a second lamination design. As shown in FIGS. 3B and 3D, the stator laminations 26 with the second lamination design can each include an axial slot 30 as well as an additional notch 52 protruding radially outward from the axial slot 30. The additional notches 52 can be in fluid communication with the outer notches 50 when the stator laminations 26 are stacked together so that the coolant received by the outer notches 46 can flow through the additional notches 52 to the axial slots 30.

As shown in FIGS. 3C and 3D, stator laminations 26 with the third lamination design can each include an axial slot 30 and can be positioned axially outward from the stator laminations 26 with the second lamination design (i.e., the stator laminations 26 with the third lamination design can be only directly adjacent to the stator laminations 26 with the second lamination design, while the stator laminations 26 with the second lamination design can be directly adjacent to the stator laminations 26 with the third lamination design as well as the stator laminations 26 with the first lamination design). As described above, all three lamination designs can include the axial slots 30 at substantially the same radial location so that, once the coolant reaches the axial slots 30 of the stator laminations 26 of the second lamination design, the coolant can flow through the axial slots 30 of adjacent stator laminations 26 of the first, the second, and/or the third lamination design. Using the configuration described above, the lamination stack can be assembled as a solid stack while still providing a path for the coolant to travel from the coolant jacket 42 toward a core of the stator assembly 24.

Figure 4:
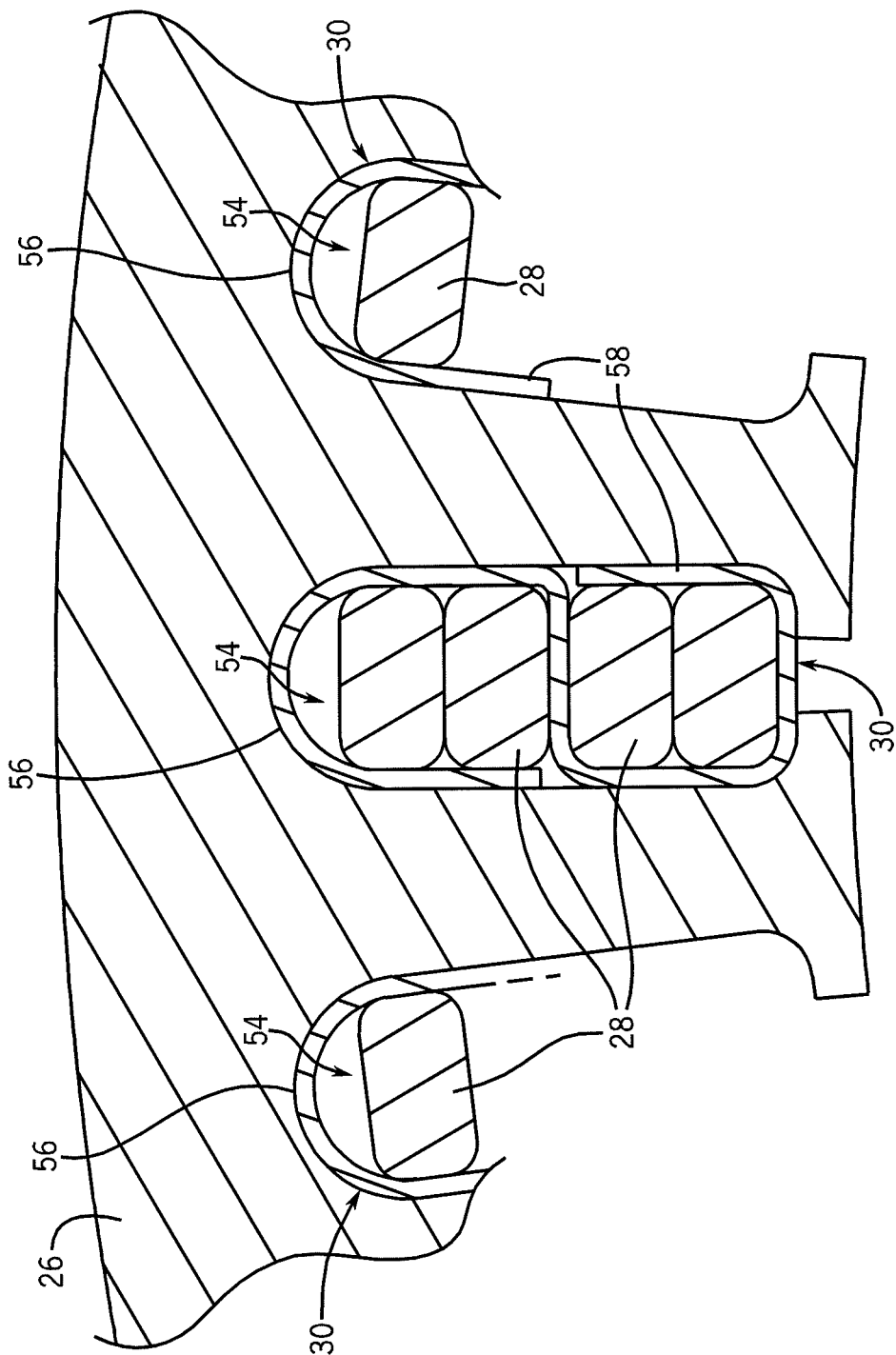
FIG. 4 is a partial side cross-sectional view of a stator assembly according to one embodiment of the invention.

In some embodiments, the axial slots 30 of the stator laminations 26 (i.e., of the first, second, and/or third lamination design) can be larger than axial slots of conventional stator assemblies. The stator laminations 26 can define a coolant channel 54. More specifically, each of the axial slots 30 can be large enough to provide room for the plurality of conductors 30 as well as the coolant channel 54, as shown in FIGS. 2 and 4. Also, in some embodiments, as shown in FIG. 4, each of the axial slots 30 can have a curved inner end portion 56.

Slot liners 58 can be positioned across the axial length of the stator assembly 24 through each of the axial slots 30, and the plurality of conductors 28 can be positioned through the slot liners 58. In some embodiments, the slot liners 58 can be flexed upward substantially against the curved inner end portions 56 of the axial slots 30. As a result, the coolant channels 54 can be defined between an inner surface of the slot liner 58 and an outer surface of the radially outer-most conductor 28, as shown in FIG. 4.

Figure 5:
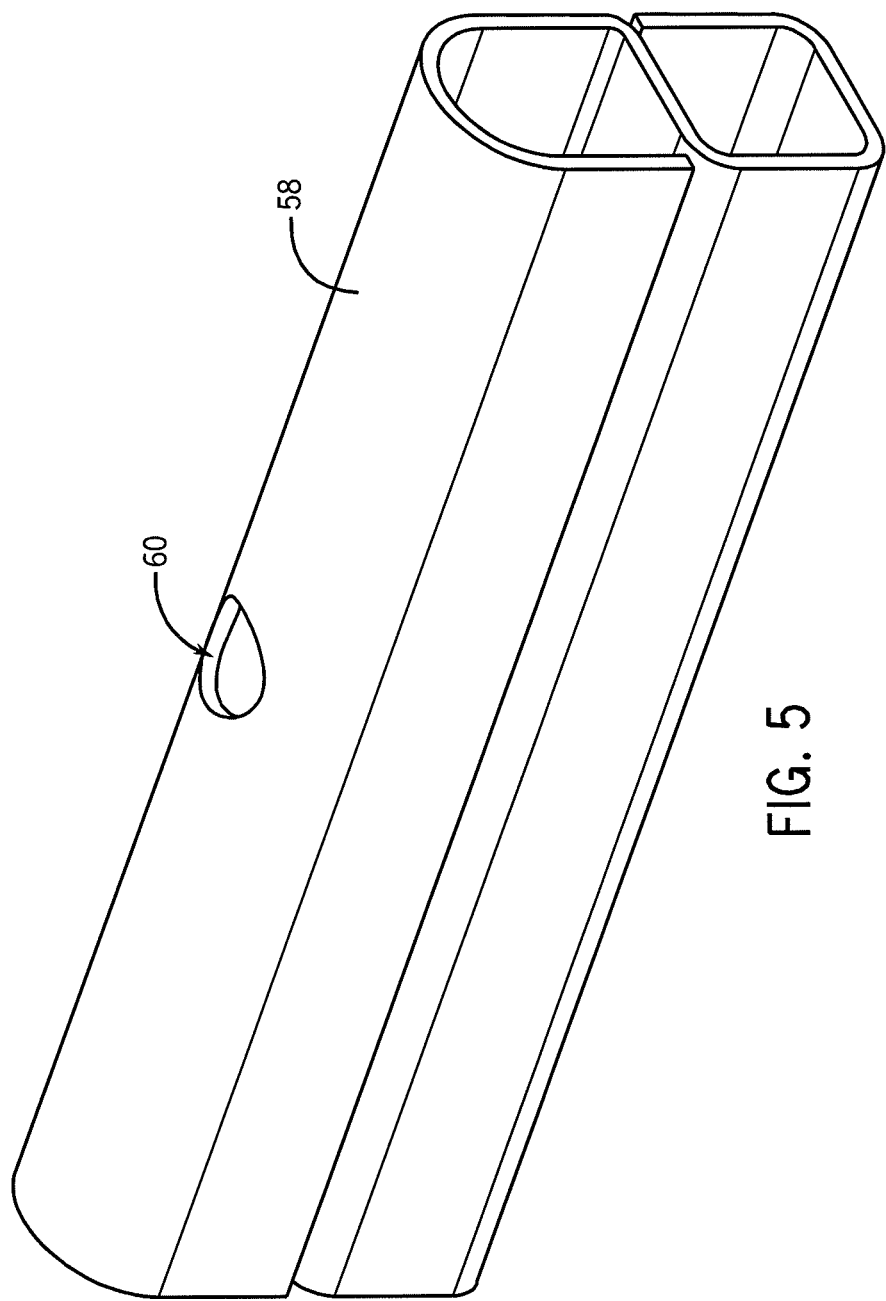
FIG. 5 is a perspective view of a slot liner for use with the stator assembly of FIG. 4.

In some embodiments, an area of the slot liner 58 positioned adjacent to the stator laminations 26 with the second lamination design can include a slot hole 60, as shown in FIG. 5. The slot hole 60 can be in fluid communication with the coolant passageway 46 and the coolant channel 54. Further, the slot hole 60 can allow the coolant to flow from the additional notch 52 through the slot hole 60 to the axial slot 30. More specifically, the coolant can flow from the coolant jacket 42, through the coolant passageway 46, which can, at least partially, fluidly connect the coolant jacket 42 with the coolant channel 54. The coolant then can flow through the outer notch 50, through the additional notch 52, through the slot hole 60, and into the coolant channel 54 within the axial slots 30. In other embodiments, the slot hole 54 can be located at other areas along the axial length of the slot liner 52 to allow the coolant to reach the coolant channels 54 from the additional notches 52. In addition, in other embodiments, the coolant channels 54 can be defined between a surface of the curved inner end portion 56 and an outer surface of the slot liner 58, or partially between the surface of the curved inner end portion 56 and the outer surface of the slot liner 58 and partially between the inner surface of the slot liner 58 and the outer surface of the radially outer-most conductors 28.

By providing the coolant through the coolant channels 54, the coolant can help directly cool the plurality of conductors 28 across substantially an entire axial length of the stator assembly 24. More specifically, the coolant can reach the radially outer-most conductor 28 through the axial slots 30 to help cool the plurality of conductors 28. The coolant channel configuration can help eliminate the multiple thermal resistances between the heat-generating conductors 28 and the coolant in conventional motor modules (i.e., where heat must be conducted through multiple mediums to reach the coolant jacket 42). The coolant channel configuration can also help minimize hot spots that are created within electric machines using conventional cooling systems. Further, the coolant channel 54 can be in fluid communication with the machine cavity 20. More specifically, once the coolant reaches axial ends of the stator assembly 24, the coolant can flow out from the coolant channel 54 and into the machine cavity 20. In some embodiments, the coolant can flow out from the coolant channel 54 and be directed onto the end turns 32 (e.g., by centrifugal force and/or an additional guide member).

In some embodiments, the stator laminations 26 of the first lamination design and the stator laminations 26 of the second lamination design can include an outer notch 50 and an additional notch 52, respectively, for each axial slot 30 in order to provide coolant through each axial slot 30. In other embodiments, the stator laminations 26 with the first lamination design and the second lamination design can include an outer notch 50 and an additional notch 52, respectively, for alternating axial slots 30 in order to provide coolant through only some axial slots 30.

In other embodiments, the stator laminations can comprise other lamination designs in order to provide fluid communication between the coolant passageways 46 and the coolant channels 54.

In some embodiments, the stator conductors 28 can comprise bondable wires that are coated with an adhesive. Once heated, the adhesive can activate and set to secure the wires in place. Also, the end turns 32 can be varnish impregnated.

In some embodiments, additional spray jets or coolant apertures (not shown) can be located through the inner wall 48 near axial ends of the stator assembly 24 in order to allow the coolant to be dispersed into the machine cavity 20, for example, toward the end turns 32. In some embodiments, the coolant channel configuration described above can decrease or eliminate the need for the spray jets or the coolant apertures.

In some embodiments, a small portion of the coolant can leak into the radial air gap 38 from the coolant channel 54. The coolant channel 54 can be positioned so that the small portion of leaked coolant is not enough to cause excessive torque loss from shearing during operation of the electric machine 18. In some embodiments, the larger axial slots 30 can slightly increase magnetic reluctance of the stator assembly 24, although the location of the axial slots 30 may typically not be an area of highest flux density within the electric machine 18. In addition, the gain in cooling capacity while using the coolant channel configuration described above can outweigh any decrease in performance (or increase in electric machine size).

It will be appreciated by those skilled in the art that while the invention has been described above in connection with particular embodiments and examples, the invention is not necessarily so limited, and that numerous other embodiments, examples, uses, modifications and departures from the embodiments, examples and uses are intended to be encompassed by the claims attached hereto. The entire disclosure of each patent and publication cited herein is incorporated by reference, as if each such patent or publication were individually incorporated by reference herein. Various features and advantages of the invention are set forth in the following claims.

The invention claimed is:

1. An electric machine module comprising:
an electric machine including a stator assembly, the stator assembly including a plurality of stator laminations coupled together and a plurality of conductors positioned through axial slots of the plurality of stator laminations;
a coolant channel at least partially defined within the axial slots;
a housing at least partially circumscribing the electric machine and at least partially defining a machine cavity, the coolant channel being in fluid communication with the machine cavity;
wherein the housing includes a sleeve member with a coolant jacket which substantially circumscribes the stator assembly, the sleeve member including at least one coolant passageway which at least partially fluidly connects the coolant jacket with the coolant channel.

2. The electric machine module of claim 1, wherein the plurality of stator laminations include at least a first set of stator laminations and a second set of stator laminations positioned adjacent to the first set of stator laminations.

3. The electric machine module of claim 2, wherein the first set of stator laminations and the second set of stator laminations provide a fluid communication path between the coolant passageway and the coolant channel.

4. The electric machine module of claim 3, wherein the coolant channels are at least partially defined between an inner surface of the slot liners and an outer surface of at least some of the plurality of conductors.

5. The electric machine module of claim 4, wherein a coolant is capable of being dispersed into the coolant jacket, flowing through the coolant passageway, through the slot hole, into the coolant channel, and toward the conductor end turns to cool the electric machine.

6. The electric machine module of claim 1, and further comprising a plurality of slot liners positioned through the axial slots and across an axial length of the stator assembly, at least a portion of the plurality of slot liners including a slot hole, and the slot hole allowing fluid communication between the coolant channel and the coolant passageway.

7. The electric machine module of claim 6, wherein the stator assembly includes conductor end turns.

8. An electric machine module comprising:
an electric machine including a stator assembly, the stator assembly including a plurality of stator laminations coupled together and a plurality of conductors positioned through axial slots of the plurality of stator laminations;
a coolant channel at least partially defined within the axial slots;
a housing at least partially circumscribing the electric machine and at least partially defining a machine cavity, the coolant channel being in fluid communication with the machine cavity; and
an outside housing and a coolant jacket between the outside housing and a sleeve member of the housing, the coolant jacket substantially circumscribing the stator assembly and including at least one coolant passageway, and the at least one coolant passageway at least partially fluidly connecting the coolant jacket and the coolant channel.

* * * * *